US012673683B2

(12) United States Patent
Grossmann et al.

(10) Patent No.: US 12,673,683 B2
(45) Date of Patent: Jul. 7, 2026

(54) METHOD TO PREVENT POWER REDUCTION

(71) Applicant: ZF Friedrichshafen AG, Friedrichshafen (DE)

(72) Inventors: Michael Grossmann, Horgenzell (DE); Daniel Morgenweck, Lindau (DE); Oussama Jabloun, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 55 days.

(21) Appl. No.: 18/603,720

(22) Filed: Mar. 13, 2024

(65) Prior Publication Data

US 2024/0308523 A1 Sep. 19, 2024

(30) Foreign Application Priority Data

Mar. 16, 2023 (DE) ...................... 10 2023 202 376.8

(51) Int. Cl.
B60W 30/184 (2012.01)
B60L 58/27 (2019.01)
B60W 10/08 (2006.01)
B60W 10/24 (2006.01)

(52) U.S. Cl.
CPC ......... B60W 30/1843 (2013.01); B60L 58/27 (2019.02); B60W 10/08 (2013.01); B60W 10/24 (2013.01); B60L 2240/545 (2013.01)

(58) Field of Classification Search
CPC .. B60W 30/1843; B60W 10/08; B60W 10/24;
B60W 50/0097; B60L 58/27; B60L 2240/545; B60L 58/26; B60L 3/12; B60L 3/003; B60L 3/0046; B60L 3/0061; B60R 16/0236
See application file for complete search history.

(56) References Cited

U.S. PATENT DOCUMENTS

| | | | |
|---|---|---|---|
| 11,211,895 B2 | 12/2021 | Gemassmer et al. | |
| 2014/0207363 A1 | 7/2014 | Kanno et al. | |
| 2022/0324351 A1* | 10/2022 | Ibanez | H01M 10/635 |
| 2023/0234418 A1* | 7/2023 | Lee | B60L 58/24 |

FOREIGN PATENT DOCUMENTS

| | | |
|---|---|---|
| DE | 10 2019 217 584 A1 | 5/2021 |
| DE | 10 2020 216 157 A1 | 6/2021 |
| DE | 10 2021 127 836 A1 | 4/2023 |

OTHER PUBLICATIONS

United States Patent Office, Non-Final Office Action issued in U.S. Appl. No. 18/603,802 (Mar. 3, 2026).

* cited by examiner

*Primary Examiner* — Brian P Sweeney
(74) *Attorney, Agent, or Firm* — Secant IP, PLLC

(57) ABSTRACT

A method is disclosed for preventing a power reduction in an electric drive system of a vehicle (3) during a journey of the vehicle. The method includes a component-tempering process (P2) in which at least one component (4, 5, 6) of the electric drive system is tempered, such that the method comprises a power reduction prediction process (P1) in which it is checked whether a power reduction is to be expected during a journey. The component-tempering process (P2) is initiated as soon as the power reduction prediction process (P1) has recognized that a power reduction is to be expected during the journey.

12 Claims, 5 Drawing Sheets

METHOD TO PREVENT POWER REDUCTION

RELATED APPLICATIONS

This application claims the benefit of and right of priority under 35 U.S.C. § 119 to German Patent Application no. 10 2023 202 376.8, filed on 16 Mar. 2023, the contents of which are incorporated herein by reference in its entirety.

TECHNICAL FIELD

The invention relates to a method for preventing power reduction in an electric drive system of a vehicle, a system, a vehicle, a computer program, and a computer-readable medium, as variously disclosed herein.

BACKGROUND

Electric vehicles typically comprise an electric drive system with various components, such as for example at least one electric motor, at least one inverter, and at least one battery. In particular, during the operation of electric vehicles, inverters and electric motors can get very hot, and if certain maximum temperatures are exceeded, this can make it necessary to reduce the power of the vehicle and especially the power of an electric motor or an inverter. In such cases, one speaks of power reduction, while in English the term "derating" can also be used. Such derating occurs, for example, when driving uphill.

Such heating of components of the electric drive system, in particular inverters and electric motors, can also take place when driving downhill, during which the recuperation performance of the electric drive system and thus also some of the braking performance must be reduced. This has the disadvantage that energy is unnecessarily wasted, which would otherwise be stored in the battery or could be supplied to various ancillary consumers.

SUMMARY

The purpose of the present invention is to overcome the disadvantages of the prior art, or at least to reduce them.

This objective is achieved by a method for preventing power reduction in an electric drive system of a vehicle while driving the vehicle, wherein the method comprises a component-tempering process, wherein at least one component of the electric drive system is tempered, wherein the method comprises a power reduction prediction process in which it is checked whether the power reduction is to be expected during the journey, and wherein the component-tempering process is started as soon as it has been recognized from the power reduction prediction process that a power reduction during the journey is to be expected.

The method is in particular a method for preventing a power reduction in a situation that causes heating, for example while driving uphill or downhill. Typically, the vehicle is an electric vehicle, i.e., one that is powered at least partially with the help of one or more electric motors. "Tempering" of a component typically means cooling or heating the component. The component can be, for example, an inverter, an electric motor or a battery of the electric drive system. "The course of the journey" is for example a future travelling route, such as a future route with a length of about 2 km to about 20 km, or about 5 km to about 50 km, or about 10 km. In this patent application the term "about" should be understood to express a tolerance of ±20%, better still ±10% and preferably ±5%.

In advantageous embodiments, in the context of the component-tempering process at least one component of the electric drive system, in particular an inverter and/or an electric motor and/or a battery, is cooled. In particular, such cooling is preventive cooling which has the advantage that in a simple manner, if a risk of overheating is expected that risk can be minimized, so that a power reduction or even a reduction of the recuperation performance during the course of the journey can be reduced.

In advantageous embodiments, in the context of the component-tempering process at least one component of the electric drive system, in particular a battery, is heated. Such heating of a battery can be advantageous in some situations because in that way the battery can be changed to an operating condition which is ideal for power uptake. The inventors have found that in some situations it is expedient if, during the component-tempering process, on the one hand an inverter and/or an electric motor is cooled and on the other hand a battery is heated. However, heating of the battery is not absolutely necessary.

In typical embodiments the power reduction prediction process comprises an uphill driving prediction and/or a downhill driving prediction. In the uphill driving prediction, it is determined whether during the course of the journey an uphill drive is expected. In the downhill driving prediction, it is determined whether during the course of the journey a downhill drive is expected. If it emerges that an uphill drive and/or a downhill drive is expected, then in typical embodiments of the method it is recognized from the power reduction prediction process that a power reduction is to be expected during the course of the journey. In typical embodiments an uphill drive is recognized when a drive uphill over a distance of at least about 500 m, preferably at least about 1 km, better still at least about 2 km and advantageously at least about 5 km, is forthcoming. In advantageous embodiments a downhill drive is recognized when a drive downhill over a distance of at least about 500 m, preferably at least about 1 km, advantageously at least about 2 km, and particularly preferably at least about 5 km, is forthcoming. In typical embodiments, with an imminent uphill drive of at least about 2 minutes, preferably at least about 4 minutes, and particularly preferably at least about 6 minutes, an uphill drive is recognized. In typical embodiments, with an imminent downhill drive of at least about 2 minutes, preferably at least about 4 minutes, and particularly preferably at least about 6 minutes, a downhill drive is recognized.

In typical embodiments, as part of the power reduction prediction process it is estimated with the help of a temperature model of the electric drive system whether, within a forthcoming travelling route of the vehicle, with maximum cooling power at least one component of the electric drive system is likely to heat up to above a respective maximum temperature. If that is the case, then typically the component-tempering process is initiated. In advantageous embodiments, the component-tempering process is started about 2 minutes to about 20 minutes, preferably about 5 minutes to about 15 minutes, and advantageously about 10 minutes before the maximum temperature is likely to be exceeded. In advantageous embodiments, the component-tempering process is started about 2 minutes to about 20 minutes, preferably about 5 minutes to about 15 minutes, and advantageously about 10 minutes before an uphill or a downhill drive begins. In typical embodiments, the component-tempering process is started about 2 km to about 20 km, preferably about 5 km to about 15 km, and advantageously about 10 km before an uphill or a downhill drive begins. The inventors have found that such time intervals and/or distances until the beginning of the component-tempering process enable a particularly good balance on the one hand between the prevention of power reduction and reduction of recuperation performance, and on the other hand the energy efficiency of the vehicle. In principle, however, it is also conceivable to initiate the component-tempering process at other points in time.

In advantageous embodiments, the method comprises a step of terminating the component-tempering process, in the context of which the component-tempering process is stopped when it is recognized that further cooling and/or heating is no longer necessary. The component-tempering process termination step is typically carried out when it is recognized that there is a sufficient temperature reserve for the battery and/or the inverter and/or the electric motor. In advantageous embodiments, the component-tempering process termination step is, in particular, carried out if it is recognized that the respective maximum temperature will not be reached in any of the components of the electric drive system, in particular neither in the battery, nor in the inverter, nor in the electric motor. Such a component-tempering process termination step has the advantage that in this way, the energy efficiency of the vehicle in which the method is being implemented can be improved, because nothing is cooled or heated unnecessarily. The component-tempering process termination step can, so to speak, be regarded as a correction in real time of an estimate made in the context of the component-tempering process.

In advantageous embodiments, the power reduction prediction process comprises a vehicle-to-vehicle communication system and/or a means for taking into account one or more environmental details. In typical embodiments, the power reduction prediction process comprises in particular the taking into account one or more of the following environmental details: speed restriction and/or speed change and/or uphill and/or downhill gradient and/or traffic-lights and/or traffic around roundabouts and/or cross-roads and/or traffic-jams and/or accidents. In typical embodiments, in the context of the power reduction prediction process at least one of these environmental details can be called up from a databank and/or read out from a map of a navigation system and/or called for by means of a vehicle-to-vehicle communication from one or more other vehicle(s).

The objective is also achieved by a system comprising means for at least partially carrying out a method according to at least one of the above-mentioned embodiments.

Typically, such a system comprises at least an inverter cooling system and/or an electric motor cooling system and/or a battery cooling system and/or a battery heating system and/or a coordination system for coordinating at least one of the aforesaid measures.

In advantageous embodiments, the system is suitable for at least partially carrying out and/or coordinating and/or controlling a method for preventing a power reduction in accordance with at least one of the aforesaid embodiments. For that purpose the system advantageously comprises suitable components, for example, a component-tempering component and/or a power reduction prediction component and/or an uphill driving prediction component and/or a downhill driving prediction component and/or a temperature model of the electric drive system and/or a number of temperature sensors for detecting the individual operating temperatures of the components of the electric drive system and/or a component-tempering process termination component and/or a vehicle-to-vehicle communication component and/or an environmental data call-up component and/or a component for taking environmental data into account and/or a control component which is suitable for controlling the method.

To good advantage, in the system at least some of the components are implemented by means of computer program codes. In advantageous embodiments of the system, in particular some of the components are at least partially part of a vehicle control system and/or a Cloud. In typical embodiments, the system comprises a digital control unit and/or a display and/or means for data input and/or means for data output.

In an embodiment of the invention, a vehicle is suitable for carrying out a method in accordance with at least one of the aforesaid embodiments and/or comprises a system according to one of the aforesaid embodiments. For that purpose, typically the vehicle contains means for carrying out a method according to at least one of the embodiments.

In an embodiment of the invention, a computer program comprises commands which, when the computer program is run in a computer or a control unit, causes these to carry out one of the aforesaid methods. The computer program can also be called a computer program product.

In an embodiment of the invention, a computer-readable medium comprises computer program codes for carrying out one of the methods. The term "computer-readable medium" is, however, understood to mean not exclusively hard disks and/or servers and/or memory sticks and/or flash memories and/or DVDs and/or Bluerays and/or CDs. In addition, the term "computer-readable medium" also includes a data stream such as those produced when a computer program and/or a computer program product is downloaded from the Internet.

BRIEF DESCRIPTION OF THE FIGURES

Below, the invention is explained briefly with reference to diagrams, which show.

DESCRIPTION OF PREFERRED EXAMPLE EMBODIMENTS

Figure 1:
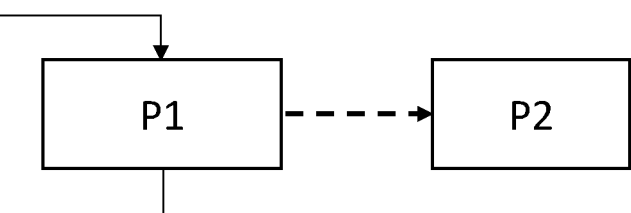
FIG. 1: A schematic representation of a first embodiment of a method according to the invention.

FIG. 1 shows a schematic representation of a first embodiment of a method according to the invention. In particular, FIG. 1 shows a method for preventing power reduction in an electric drive system of a vehicle (the vehicle is not shown in FIG. 1) during a journey of the vehicle. This method comprises a power reduction prediction process P1, which is implemented in an endless loop. The endless loop is symbolized by the arrow which emerges at the bottom from the power reduction prediction process P1 represented as a rectangle and re-enters it again at the top. In this power reduction prediction process P1, it is checked whether during the journey of the vehicle a power reduction, in other words a 'derating', is to be expected, which for example can be caused by overheating of an inverter or an electric motor. If, by virtue of the power reduction prediction process P1, it is found that such a power reduction is to be expected during the journey of the vehicle, then the power reduction prediction process P1 calls up a component-tempering process P2. This calling up (or in other words initiation) of the component-tempering process P2 by the power reduction prediction process P1 is represented in FIG. 1 by the broken-line arrow. However, if in the power reduction prediction process P1 it is not found that a power reduction is to be expected, the component-tempering process P2 is not started. As regards the component-tempering process P2, as soon as this has been started, a component of an electric drive system of the vehicle is tempered, i.e., for example cooled, in order to counteract the threatened overheating and hence reduction of power. In many embodiments it is also possible for several components to be tempered, in particular cooled by the component-tempering process P2, for example, an inverter and an electric motor at the same time. Furthermore, it is possible that during the component-tempering process P2, if necessary, besides the cooling of at least one component, another component is heated. For example, it is possible, when a downhill drive is imminent, for an inverter to be cooled and a battery heated at the same time. In that way overheating of the inverter is avoided and the battery can be pre-conditioned for optimum power uptake.

Figure 2:
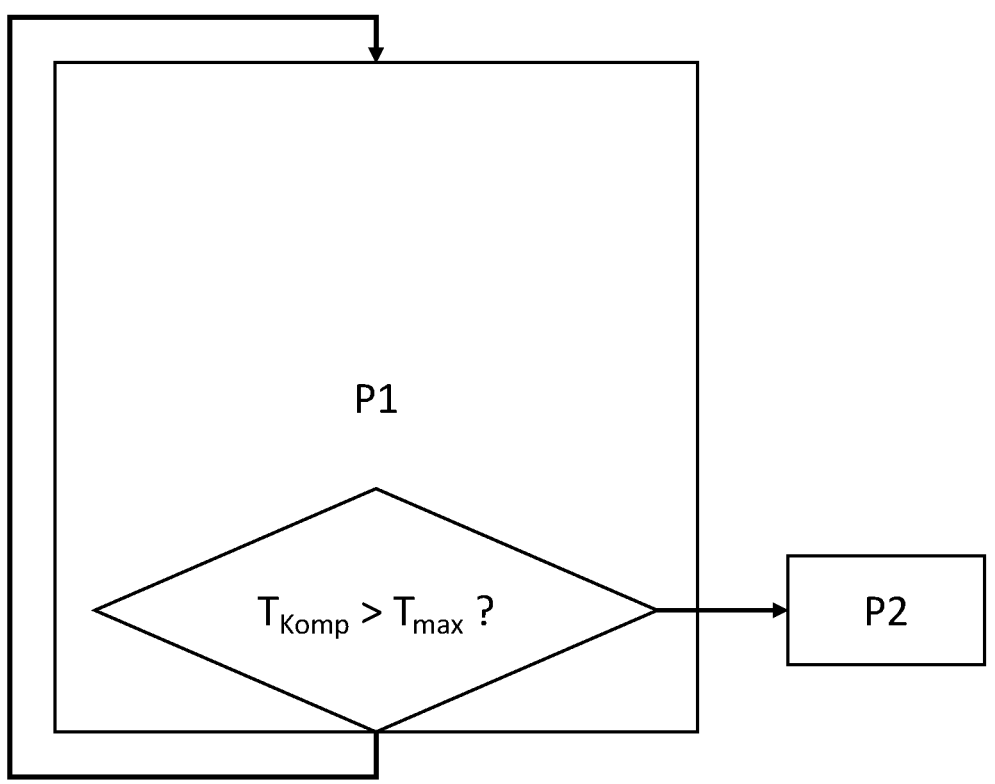
FIG. 2: A schematic representation of a second embodiment of a method according to the invention.

FIG. 2 shows a schematic representation of a second embodiment of a method according to the invention. As already shown in FIG. 1, in FIG. 2 a power reduction prediction process P1 is shown, which is in the form of an endless loop. In other words, the power reduction prediction process P1 is permanently active. The statements made in relation to FIG. 1 can in principle also be applied to the example embodiment in FIG. 2. In addition, however, FIG. 2 illustrates a special case in which an expected temperature $T_{Komp}$ of a particular component is continually compared with a maximum temperature $T_{max}$ of the particular component. The component-tempering process P2 is called up if the expected temperature $T_{Komp}$ of the particular component is higher tan the maximum temperature $T_{max}$ of the particular component. So long as the expected temperature $T_{Komp}$ of the particular component is lower than or equal to the maximum temperature for the component, the component-tempering process P2 is not called up. In advantageous embodiments, as part of the power reduction prediction process P1, for every component of an electric drive system that can be tempered a comparison is carried out between the expected temperature of the component and the maximum temperature thereof. If it is found that for a particular component the corresponding maximum temperature will be exceeded, then the component-tempering process P2 is initiated (or in other words, started).

Figure 3:
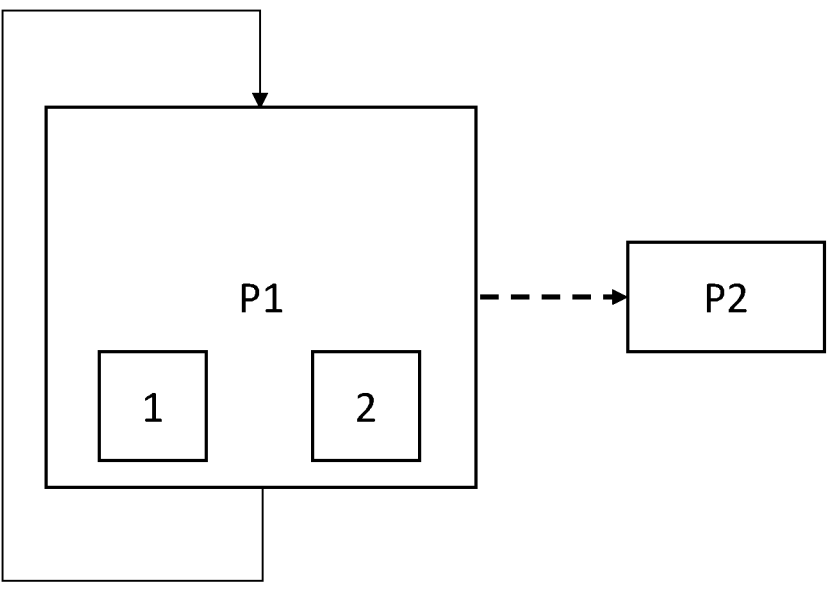
FIG. 3: A schematic representation of a third embodiment of a method according to the invention.

FIG. 3 shows a schematic representation of a third embodiment of a method according to the invention. In particular, FIG. 3 again shows a method according to the invention with a power reduction prediction process P1 and a component-tempering process P2. The power reduction prediction process is again in the form of an endless loop which is symbolized by a rectangular arrow emerging from the power reduction prediction process P1 at the bottom and re-entering it at the top. In the example embodiment shown in FIG. 3 as well, the power reduction prediction process P1 initiates the component-tempering process P2 as soon as a power reduction, for example caused by heating and/or by a reduction of recuperation performance, is expected. This starting of the component-tempering process P2 by the power reduction prediction process P1 is again represented by a broken-line arrow. In the example embodiment shown in FIG. 3, the power reduction prediction process P1 also comprises an uphill driving prediction 1 and a downhill driving prediction 2. The uphill driving prediction typically continually accesses data from other vehicles and/or environmental information from a databank and from that data continually determines whether an uphill drive is to be expected. For this, the communication with other vehicles typically takes place by way of a vehicle-to-vehicle communication process (not shown in FIG. 3). If an uphill drive can be expected, the component-tempering process P2, which adopts or prepares suitable measures such as cooling an inverter and/or an electric motor, is started. The downhill driving prediction 2 works analogously to the uphill driving prediction 1: for the downhill driving prediction 2 as well, with reference to data called up, for example, from other vehicles or from databanks as environmental information, it is checked continually whether a downhill drive is imminent (or in other words, is to be expected). If the downhill driving prediction 2 indicates that a downhill drive is to be expected, then the power reduction prediction process P1 initiates the component-tempering process P2, which then prepares and/or starts a corresponding tempering process, i.e., cooling or heating the components to be tempered.

Figure 4:
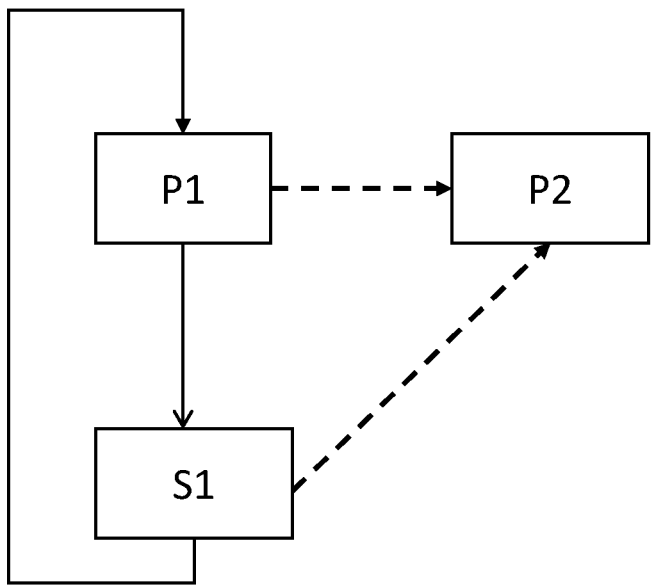
FIG. 4: A schematic representation of a fourth embodiment of a method according to the invention.

FIG. 4 shows a schematic representation of a fourth embodiment of a method according to the invention. The embodiment shown in FIG. 4 corresponds to the embodiment already shown in FIG. 1, but with the difference that the method shown in FIG. 4 also comprises a component-tempering process termination step S1. This component-tempering process termination step S1 is in the same endless-loop form as the power reduction prediction process P1. In the component-tempering process termination step S1 it is checked whether the, or a component-tempering process is currently active, and if so, whether the component-tempering process P2 can be terminated, for example, because for the component currently being tempered by the component-tempering process P2 further cooling and/or heating is no longer necessary. For example, that can be the case if, during an uphill drive, an inverter or an electric motor has heated up less than expected. By such premature termination of the component-tempering process P2 by virtue of the component-tempering process termination step S1, energy can be saved since no unnecessary cooling or heating is carried out. In FIG. 4 the termination of the component-tempering process P2 by the component-tempering process termination step S1 is represented by a broken-line arrow.

In typical embodiments such as the example embodiments shown in FIGS. 1 to 4, the component-tempering process P2 does not begin tempering the components to be tempered immediately at the beginning of the component-tempering process P2, but rather, after a time delay such that the tempering of the components to be tempered is started about 2 minutes to 20 minutes, advantageously about 5 minutes to about 15 minutes, and preferably about 10 minutes before a maximum temperature of the components that would give rise to a power reduction is reached.

Figure 5:
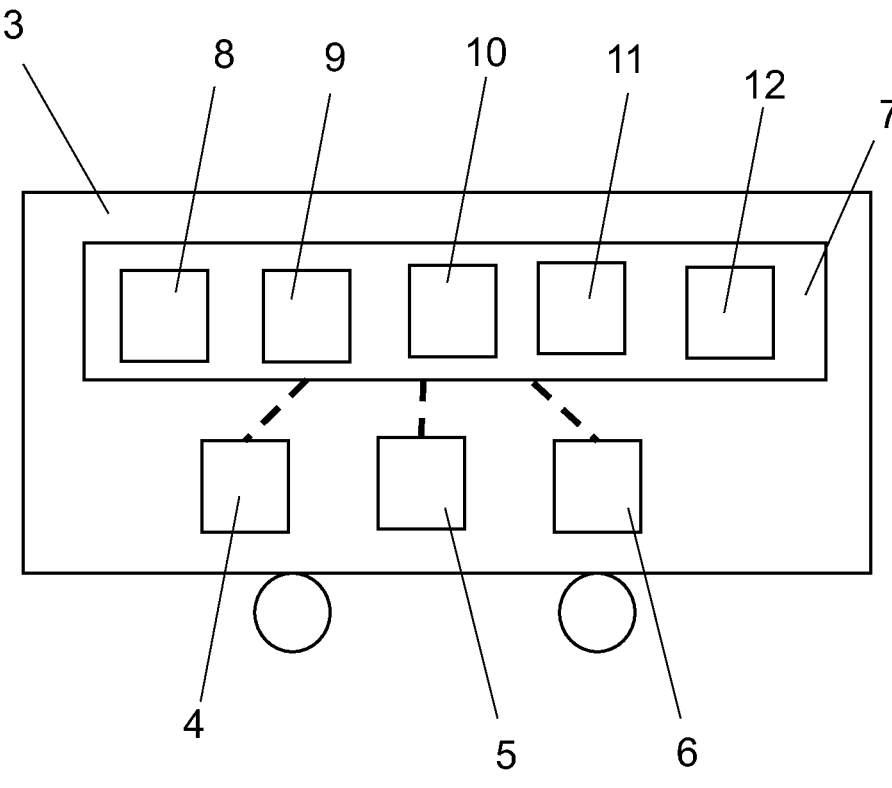
FIG. 5: A schematic representation of an example embodiment of a vehicle according to the invention, with a system according to the invention.

FIG. 5 shows a schematic representation of an example embodiment of a vehicle 3 according to the invention with a system 7 according to the invention. In particular, in FIG. 5 a vehicle 3 is represented, which comprises an electric motor 4, an inverter 5, and a battery 6. The vehicle 3 further comprises a system 7 for carrying out a method for preventing a power reduction. For its part, the system 7 comprises a temperature model 8, a power reduction prediction component 9, a component-tempering component 10, a vehicleto-vehicle communication component 11, and a component 12 for calling up environmental information. In the example embodiment shown in FIG. 5 the power reduction prediction component 9 also comprises an integrated uphill drive prediction component and an integrated downhill drive prediction component. However, for the sake of simplicity, the uphill drive prediction component and the downhill drive prediction component are not shown explicitly. In the system 7 the components 8, 9, 10, 11 and 12 co-operate in such manner that a method according to the invention as explained earlier is carried out. When the system 7, in particular the power reduction prediction component 9, finds that a power reduction is to be expected, then the system 7 initiates a tempering of the electric motor 4 and/or the inverter 5 and/or the battery 6. In particular, in such an event one or more such tempering processes of the electric motor 4 and/or the inverter 5 and/or the battery 6 is/are started by the component-tempering component 10. In other embodiments the system 7 can also comprise still more components, for example a component-tempering process termination component and/or a component for taking account of environmental information.

The invention is not limited to the example embodiments described. Its protective scope is defined by the patent claims.

In principle, all the methods described in the description section or in the claims can be carried out by devices which contain means for carrying out the respective process steps of this method.

INDEXES

1 Uphill driving prediction
2 Downhill driving prediction
3 Vehicle
4 Electric motor
5 Inverter
6 Battery
7 System for carrying out a method for preventing a power reduction
8 Temperature model
9 Power reduction prediction component (with integrated uphill drive prediction component and integrated downhill drive prediction component)
10 Component-tempering component
11 Vehicle-to-vehicle communication component
12 Environmental information call-up component
P1 Power reduction prediction process
P2 Component-tempering process
S1 Component-tempering termination step
$T_{Komp}$ Expected temperature of a particular component
$T_{max}$ Maximum temperature of the particular component

The invention claimed is:

1. A method for preventing a power reduction in an electric drive system of a vehicle during a journey of the vehicle, wherein the electric drive system is configured to temper at least one component of the electric drive system, the method comprising:

determining, by the electric drive system, that a power reduction is to be expected during a journey, including estimating, based on a maximum cooling power and with the use of a temperature model of the electric drive system, whether during the journey any component of the electric drive system will exceed a respective maximum temperature; and initiating tempering, by the electric drive system, after determining that the power reduction is to be expected during the journey.

2. The method according to claim 1, wherein determining that the power reduction is to be expected during the journey includes predicting an uphill driving path or a downhill driving path.

3. The method according claim 1, wherein tempering the at least one component includes heating a battery.

4. The method according to claim 1, wherein tempering the at least one component includes cooling one or more of an inverter, an electric motor, and a battery.

5. The method according claim 4, wherein tempering the at least one component includes heating the battery.

6. The method according to claim 1, comprising:

determining that cooling and/or heating is no longer necessary; and terminating tempering of the at least one component.

7. The method according to claim 6, wherein determining that cooling and/or heating is no longer necessary is performed using the temperature model of the electric drive system.

8. A method for preventing a power reduction in an electric drive system of a vehicle during a journey of the vehicle, wherein the electric drive system is configured to temper at least one component of the electric drive system, and wherein the vehicle includes a vehicle-to-vehicle communication system and a system for taking account of one or more environmental data, the method comprising:

determining, by the electric drive system, that a power reduction is to be expected during a journey; and initiating tempering, by the electric drive system, after determining that the power reduction is to be expected during the journey.

9. The method of claim 8, wherein determining that the power reduction is to be expected during the journey includes estimating, based on a maximum cooling power and with the use of a temperature model of the electric drive system, whether during the journey any component of the electric drive system will exceed a respective maximum temperature.

10. An electric drive system comprising a control unit configured to carry out the method of claim 1.

11. A vehicle comprising a control unit configured to perform the method according to claim 1.

12. A non-transitory computer-readable medium comprising commands which, when executed by a computer or a control unit, perform the method of claim 1.

* * * * *